(12) United States Patent
Nakamura

(10) Patent No.: US 12,455,548 B2
(45) Date of Patent: Oct. 28, 2025

(54) NUMERICAL CONTROL DEVICE, AND NUMERICAL CONTROL SYSTEM

(71) Applicant: FANUC CORPORATION, Yamanashi (JP)

(72) Inventor: Ryou Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 252 days.

(21) Appl. No.: 18/255,340

(22) PCT Filed: Dec. 16, 2021

(86) PCT No.: PCT/JP2021/046508
§ 371 (c)(1),
(2) Date: May 31, 2023

(87) PCT Pub. No.: WO2022/131327
PCT Pub. Date: Jun. 23, 2022

(65) Prior Publication Data
US 2024/0027990 A1    Jan. 25, 2024

(30) Foreign Application Priority Data
Dec. 18, 2020    (JP) ................................ 2020-210473

(51) Int. Cl.
G05B 19/4093    (2006.01)
B25J 9/16    (2006.01)
G05B 19/418    (2006.01)

(52) U.S. Cl.
CPC ........ G05B 19/4093 (2013.01); B25J 9/1658 (2013.01); G05B 19/41825 (2013.01)

(58) Field of Classification Search
CPC .............. B25J 9/1658; G05B 19/4093; G05B 19/41825; G05B 19/408; G05B 2219/36242; Y02P 90/02
See application file for complete search history.

(56) References Cited

U.S. PATENT DOCUMENTS 4,348,623 A * 9/1982 Kobayashi ....... G05B 19/41825
                                                         318/590
10,870,203 B2 * 12/2020 Tarui ........................ B25J 9/161
(Continued)

FOREIGN PATENT DOCUMENTS

JP    2000-010616 A    1/2000
JP    2013-134786 A    7/2013
(Continued)

OTHER PUBLICATIONS

JP-2013186729-A translation (Year: 2013).*
International Search Report issued in PCT/JP2021/046508; mailed Feb. 22, 2022.

*Primary Examiner* — Kyle T Johnson
(74) *Attorney, Agent, or Firm* — Studebaker Brackett PLLC

(57) ABSTRACT

A numerical control device 5 is provided with: a program preprocessing unit 54 for generating, on the basis of analysis results for each block of a numerical control program, a block robot instruction recognizable by a robot control device 6, and block information associated with the block robot instruction; a robot instruction storage unit 523 for storing the block robot instruction and the block information generated by the program preprocessing unit 54; a program execution management unit 58 for reading in the block information specified by a program execution instruction and the block robot instruction associated with the block information, from the robot instruction storage unit 523; and a first communication unit 59 for transmitting the block robot instruction read in by the program execution management unit 58 to the robot control device 6.

11 Claims, 6 Drawing Sheets

(56) References Cited

U.S. PATENT DOCUMENTS

| | | | |
|---|---|---|---|
| 2005/0083795 A1* | 4/2005 | Doi | G11B 27/002 |
| 2010/0064026 A1* | 3/2010 | Brown | G05B 19/4185 |
| | | | 709/217 |
| 2019/0258215 A1* | 8/2019 | Igarashi | G05B 19/4155 |
| 2019/0369582 A1* | 12/2019 | Kanemaru | G05B 19/0421 |
| 2020/0130184 A1* | 4/2020 | Suzuki | B25J 9/1666 |
| 2022/0011754 A1* | 1/2022 | Sagasaki | B25J 9/1658 |
| 2023/0251630 A1* | 8/2023 | Nakamura | G05B 19/4155 |
| | | | 700/245 |
| 2024/0027990 A1* | 1/2024 | Nakamura | G05B 19/41825 |
| 2024/0028000 A1* | 1/2024 | Imanishi | G05B 19/41825 |

FOREIGN PATENT DOCUMENTS

| | | | |
|---|---|---|---|
| JP | 2013186729 A | * | 9/2013 |
| JP | 2017-134722 A | | 8/2017 |
| JP | 6647472 B1 | | 2/2020 |

* cited by examiner

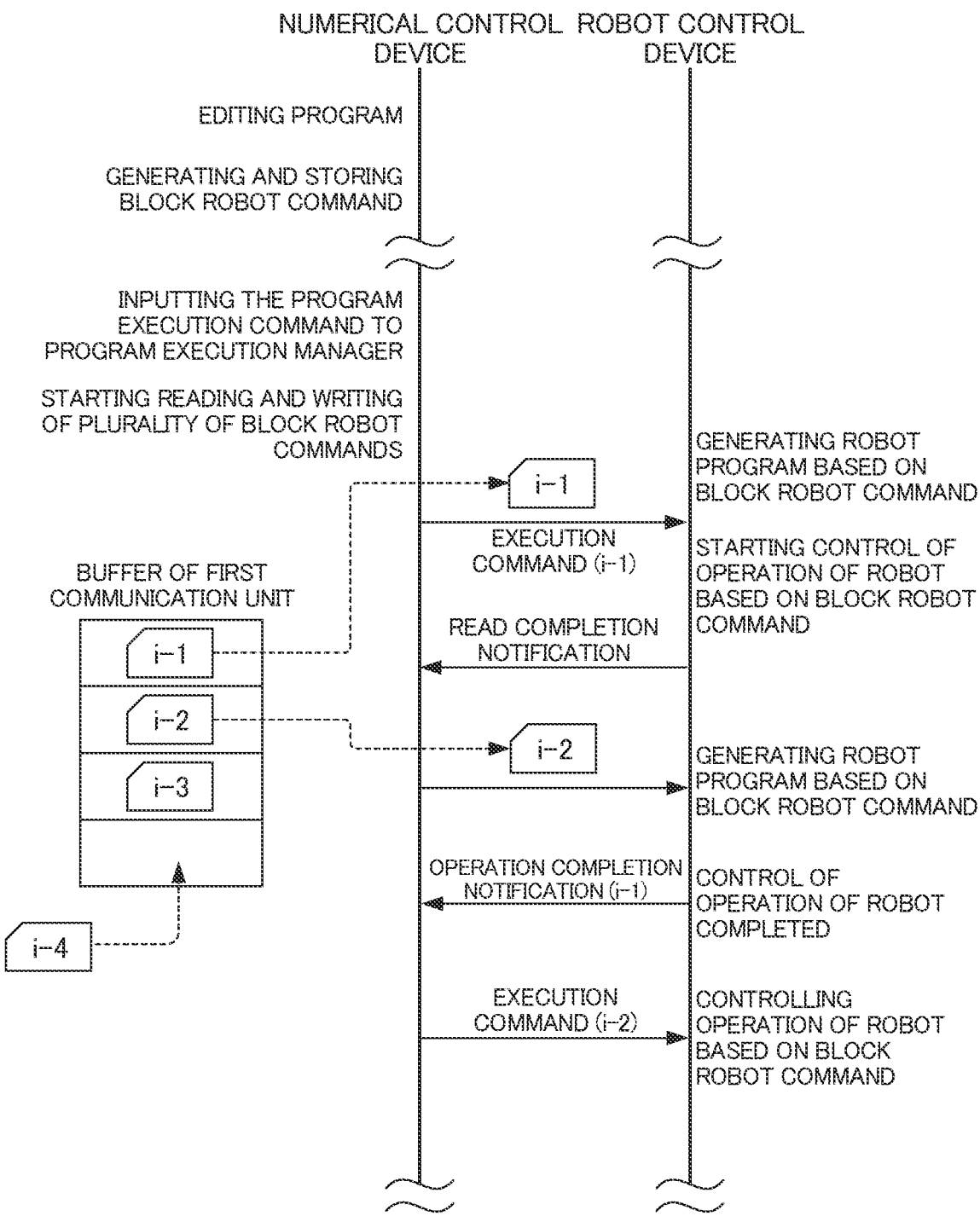

NUMERICAL CONTROL DEVICE, AND NUMERICAL CONTROL SYSTEM

TECHNICAL FIELD

The present disclosure relates to a numerical control device and a numerical control system.

BACKGROUND ART

In recent years, in order to promote automation of a machining site, a numerical control system has been desired which links and controls operation of a machine tool machining a workpiece and operation of a robot provided in the vicinity of this machine tool (for example, refer to Patent Document 1).

Generally, a numerical control program for controlling a machine tool and a robot program for controlling a robot differ in programming language. In order to interlock the operation of a machine tool and the operation of a robot, it is necessary for the operator to familiarize with both the numerical control program and robot program.

Patent Document 1 discloses a numerical control device which controls both a machine tool and robot by the numerical control program. More specifically, the numerical control system disclosed in Patent Document 1 generates a robot command recognizable in the robot control device in accordance with the numerical control program in the numerical control device, generates a robot program based on this robot command in the robot control device, and controls the operation of the robot in accordance with this robot program. According to the numerical control system shown in Patent Document 1, it is possible to also control a robot without familiarizing with the robot program, so long as being a user familiarized with the numerical control program.

However, the numerical control program is basically written in block units based on a programming language such as G code or M code, and the numerical control device executes the numerical control program in command block units. For this reason, in the conventional numerical control system, the numerical control device side successively generates robot commands in command block units, and sends this robot command to the robot control device, and the robot control device side successively generates a robot program based on the robot commands sent in command block units, and controls operation of the robot in command block units based on this robot program. It is thereby possible to synchronize the execution block executed in each of the numerical control device and robot control device.

Patent Document 1: Japanese Patent No. 6647472

DISCLOSURE OF THE INVENTION

Problems to be Solved by the Invention

However, with the conventional numerical control system, it is necessary to execute at least the three processing on the numerical control device side of reading processing of a next command block, change processing from the read command block to the robot command, and send processing of the robot command, every time control of operation of a robot completes in command block units on the robot control device side. For this reason, with the conventional numerical control system, the execution frequency of change processing also increases in proportion to the program size of the numerical control program (i.e. command block number constituting the numerical control program).

For this reason, with the conventional numerical control system, since the time required in change processing also lengthens as the program size becomes larger, there is concern over the cycle time of the robot control also lengthening by the time required in this change processing.

The present disclosure has an object of providing a numerical control device and numerical control system which can shorten the cycle time of robot control, while achieving synchronization of execution blocks of a program between the numerical control device and a robot control device.

Means for Solving the Problems

One aspect of the present disclosure provides a numerical control device which, based on a numerical control program, controls operation of a machine tool, and generates a robot command for a robot control device that controls operation of a robot, the numerical control device comprising: a program pre-processing unit configured to generate a block robot command recognizable in the robot control device, and block information associated with the block robot command, based on an analysis result of every block of the numerical control program; a robot command storage section configured to store a block robot command and block information generated by the program pre-processing unit; a program execution manager configured to read a block robot command associated with block information designated by a predetermined program execution command, from the robot command storage section; and a communication unit configured to send a block robot command read by the program execution manager to the robot control device.

One aspect of the present disclosure provides a numerical control system comprising: a numerical control device configured to control operation of a machine tool, and generate a robot command for a robot control device that controls operation of a robot, based on a numerical control program; and a robot control device configured to be communicable with the numerical control device and control operation of the robot based on a robot command sent from the numerical control device, in which the numerical control device includes: a program pre-processing unit configured to generate a block robot command recognizable in the robot control device, and block information associated with the block robot command, based on an analysis result of every block of the numerical control program; a robot command storage section configured to store a block robot command and block information generated by the program pre-processing unit; a program execution manager configured to read a block robot command associated with block information designated by a predetermined program execution command, from the robot command storage section; and a communication unit configured to send a block robot command read by the program execution manager to the robot control device; and in which the robot control device includes: a second communication unit configured to receive a block robot command sent from the first communication unit, a robot program generation unit configured to generate a robot program based on a block robot command received by the second communication unit, and an operation control unit configured to control operation of the robot based on a robot program generated by the robot program generation unit.

Effects of the Invention

In the aspect of the present disclosure, the program pre-processing unit of the numerical control device generates block robot commands recognizable in the robot control device and block information associated with this block robot command, based on analysis results for every block of the numerical control program, and the robot command storage section of the numerical control device stores the generated block robot command and block information. In addition, the program execution manager of the numerical control device reads the block robot command associated with block information designated by the block execution command from the robot command storage section, and the communication unit of the numerical control device sends the block robot command read by the program execution manager to the robot control device. According to the aspect of the present disclosure, by generating the block robot command and block information for all blocks included in the numerical control program by the program pre-processing unit in advance prior to inputting the program execution command to the program execution manager, and storing these in the robot command storage section in the above way, it is unnecessary to execute processing of generating a block robot command from the numerical control program upon sending the block robot command from the numerical control device to the robot control device. For this reason, according to the aspect of the present disclosure, it is possible to shorten the cycle time of robot control by the amount required in the generation processing of block robot commands, compared to a conventional numerical control system, while achieving synchronization of executions blocks of programs between the numerical control device and robot control device.

BRIEF DESCRIPTION OF THE DRAWINGS

FIG. 6 is a sequence diagram showing the flow of signals and information between the numerical control device and robot control device, processing executed in the numerical control device, and processing executed in the robot control device, in a numerical control system according to a second embodiment of the present disclosure.

PREFERRED MODE FOR CARRYING OUT THE INVENTION

First Embodiment

Hereinafter, a numerical control system according to a first embodiment of the present disclosure will be explained by referencing the drawings.

Figure 1:
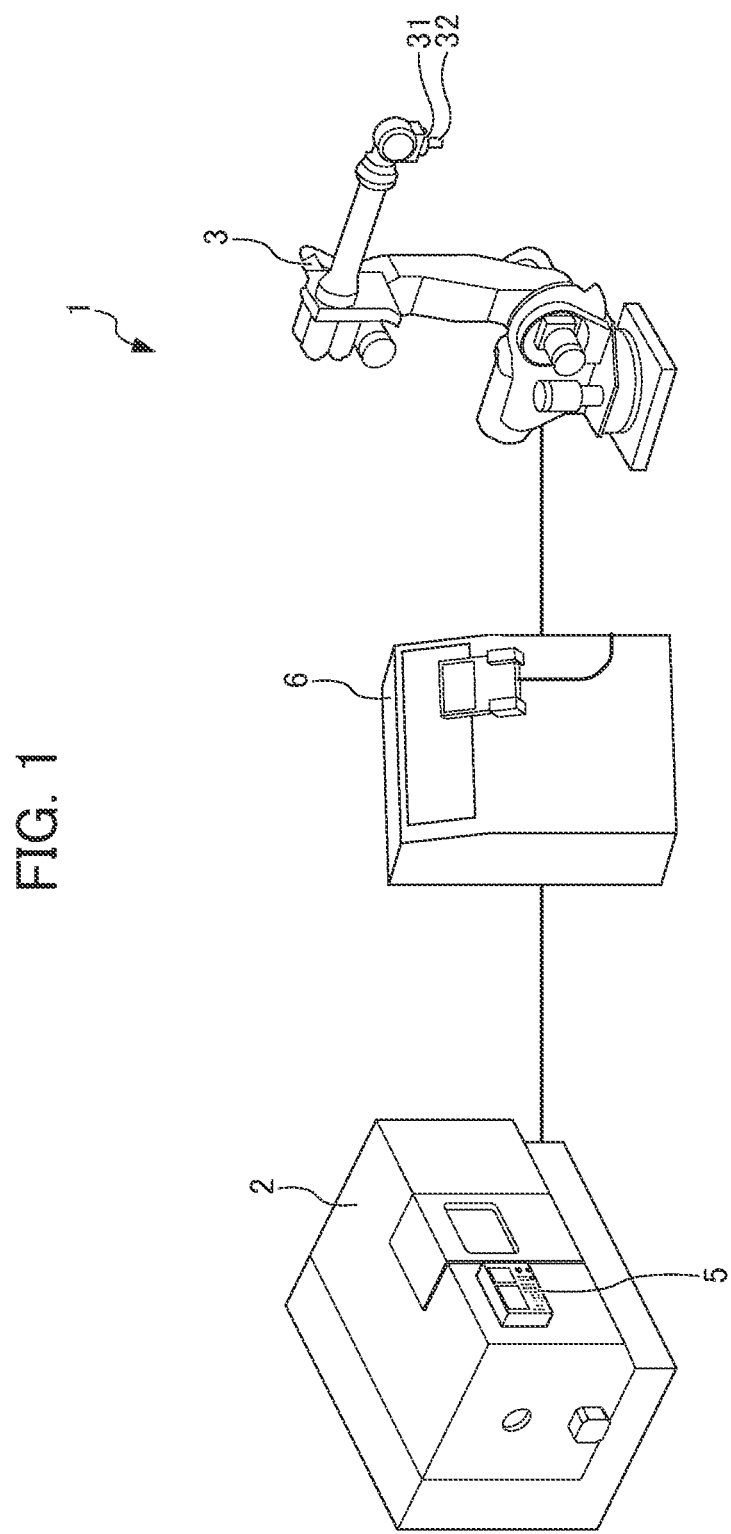
FIG. 1 is a schematic diagram of a numerical control system according to a first embodiment of the present disclosure.

FIG. 1 is a schematic diagram of a numerical control system 1 according to the present embodiment.

The numerical control system 1 includes: a machine tool 2; a numerical control device (CNC) 5 which controls operation of this machine tool 2; a robot 3 provided in the vicinity of the machine tool 2; and a robot control device 6 connected communicably with the numerical control device 5. The numerical control device 5 controls operation of the machine tool 2 based on a predetermined numerical control program, generates commands for the robot control device 6, and sends this to the robot control device 6. The robot control device 6 controls operation of the robot 3 according to commands sent from the numerical control device 5.

The machine tool 2 machines a workpiece (not shown) according to machine tool control signals sent from the numerical control device 5. Herein, the machine tool 2 is a lathe, drill press, milling machine, grinding machine, laser processing machine, injection molding machine or the like.

The robot 3 operates under the control of the robot control device 6, and performs a predetermined operation on the workpiece machined by the machine tool 2, for example. The robot 3 is an articulated robot, for example, and a tool 32 for holding, machining or inspecting the workpiece is mounted to an arm tip end 31 thereof. Hereinafter, a case of the robot 3 being a 6-axis articulated robot will be explained; however, it is not to be limited thereto. In addition, hereinafter, a case of the robot 3 being a 6-axis articulated robot will be explained; however, the number of axes is not limited thereto.

The numerical control device 5 and robot control device 6 are each a computer configured by hardware such as an arithmetic processing means such as a CPU (Central Processing Unit), an auxiliary storage means such as HDD (Hard Disk Drive) or SSD (Solid State Drive) storing various programs, a main storage means such as RAM (Random Access Memory) for storing data which is temporarily necessitated upon the arithmetic processing means executing a program, an operation means such as a keyboard on which an operator performs various operations, and a display means such as a display displaying various information to the operator. This robot control device 6 and numerical control device 5 are made able to send and receive various signals with each other by Ethernet (registered trademark), for example.

Figure 2:
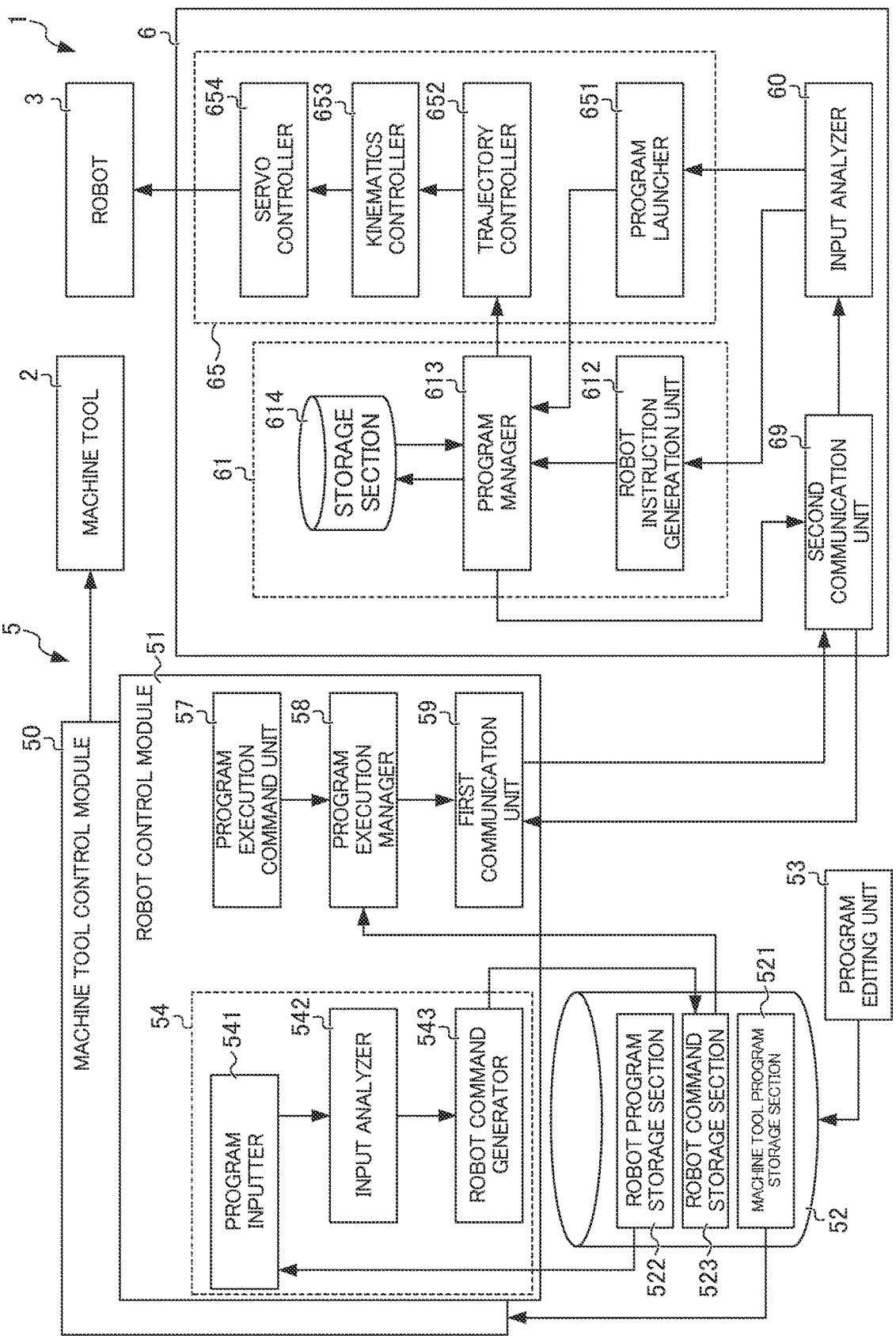
FIG. 2 is a functional block diagram of a numerical control device and a robot control device.

FIG. 2 is a functional block diagram of the numerical control device 5 and the robot control device 6.

The numerical control device 5 generates various commands for controlling operation of the robot 3 and tool 32 in accordance with the sequence explained below, and sends the generated commands to the robot control device 6. The robot control device 6 generates robot control signals for controlling operation of the robot 3 in accordance with the sequence explained below based on the commands sent from the numerical control device 5, generates I/O signals for controlling operation of the tool 32, and inputs the generated robot control signal and I/O signal to the robot 3. The robot control device 6 thereby controls operation of the robot 3 and tool 32.

First, the detailed configuration of the numerical control device 5 will be explained. As shown in FIG. 2, in the numerical control device 5, various functions such as of the machine tool control module 50 as a control system of the machine tool 2, the robot control module 51 as a control system of the robot 3, and a storage unit 52 which stores the numerical control programs, etc. executed in the machine tool control module 50 and robot control module 51, and a program editing unit 53 which creates, selects and edits numerical control programs based on an operation by the operator are realized by the above-mentioned hardware configuration.

The storage unit 52 includes: a machine tool program storage section 521 which stores numerical control programs for the machine tool, which are numerical control programs for generating machine tool control signals for the machine tool 2 in the machine tool control module 50; a robot program storage section 522 which stores robot numerical control programs, which are numerical control programs for generating robot commands for the robot 3 in the robot control module 51; and a robot command storage section 523 which stores block robot commands, block information, etc. described later.

The numerical control programs for the machine tool stored in the machine tool program storage section 521 and the numerical control programs for the robot stored in the robot program storage section 522 are configured by a plurality of command blocks written in a common programming language (for example, G code, M code or the like). Each of the pluralities of numerical control programs are stored in these program storage sections 521, 522. In addition, unique program numbers are allocated to each of the plurality of numerical control programs stored in these program storage units 521, 522.

The program editing unit 53 newly generates a new numerical control program based on operations on the operation panel (not shown) by the operator, stores this in the program storage units 521, 522, and selects or edits numerical control programs stored in the program storage units 521, 522.

The numerical control program for the machine tool is written based on the machine tool coordinate system as a first coordinate system with an origin of a reference point decided on the machine tool 2 or in the vicinity of the machine tool 2. In other words, in the numerical control program for the machine tool, the position and posture of a control point of the machine tool 2 is written by a coordinate value in the machine tool coordinate system.

The numerical control program for the robot is written based on the robot coordinate system as a second coordinate system different from the machine tool coordinate system. In other words, in the numerical control program for the robot, the position and posture of the control point of the robot 3 (for example, arm tip end 31 of robot 3) are written by the coordinate value of the robot coordinate system different from the machine tool coordinate system. This robot coordinate system is a coordinate system with an origin of a reference point decided on the robot 3 or in the vicinity of the robot 3. It should be noted that, hereinafter, a case of the robot coordinate system differing from the machine tool coordinate system will be explained; however, the present disclosure is not limited thereto. The robot coordinate system may be integral with the machine tool coordinate system. In other words, the origin of the robot coordinate system and coordinate axis directions may be made to match the origin and coordinate axis directions of the machine tool coordinate system.

In addition, the robot coordinate system in this numerical control program for the robot is switchable between two or more coordinate systems having different control axes. More specifically, the position and posture of the control point of the robot 3 in the numerical control program for the robot can be designated by orthogonal coordinate format or joint coordinate format.

In the joint coordinate format, the position and posture of the control point of the robot 3 are designated by the six real number coordinate values with components of the rotation angle values of the six joints of the robot 3 (J1, J2, J3, J4, J5, J6).

In the orthogonal coordinate format, the position and posture of the control point of the robot 3 are designated by a total of six real number coordinate values with components of the three coordinate values (X, Y, Z) along the three orthogonal coordinate axes, and three rotation angle values (A, B, C) around each orthogonal coordinate axis.

Herein, under the joint coordinate format, in order to directly designate the rotation angle of each joint of the robot 3, the axis arrangement of each arm and/or wrist of the robot 3, and rotation number of a joint rotatable by at least 360 degrees (hereinafter these are abbreviated and referred to as "form of robot 3") are also uniquely fixed. In contrast, under the orthogonal coordinate format, due to designating the position and posture of the control point of the robot 3 by six coordinate values (X, Y, Z, A, B, C), the form of the robot 3 cannot be uniquely fixed. Therefore, with the numerical control program for the robot, it becomes possible to designate the form of the robot 3 by the form value P, which is an integer value of a predetermined number of digits. Therefore, the position and posture of the control point of the robot 3 as well as the form of the robot 3 are represented by the six coordinate values (J1, J2, J3, J4, J5, J6) under the joint coordinate format, and are represented by the six coordinate values and one form value (X, Y, Z, A, B, C, P) under the orthogonal coordinate format.

With the numerical control program for the robot, it becomes possible to set the coordinate format by G code "G68.8" and "G68.9". More specifically, by inputting G code "G68.8", the coordinate format is set to the joint coordinate format, and by inputting G code "G68.9", the coordinate format is set to the orthogonal coordinate format. The G code "G68.8" and "G68.9" for setting these coordinate formats are modal. Therefore, the coordinate format is maintained after setting the coordinate format by these G code to the joint coordinate format or the orthogonal coordinate format, until the coordinate format is changed by these G code again. It should be noted that, in the present embodiment, in the case of the G code for setting these coordinate formats not being written in the numerical control program for the robot, the coordinate format shall be set automatically to the orthogonal coordinate format; however, it is not limited thereto.

The machine tool control module 50 generates a machine tool control signal for controlling operation of the machine tool 2 in accordance with the numerical control program for the machine tool stored in the machine tool program storage section 521, and inputs this to the actuator (not shown) of the machine tool 2. More specifically, the machine tool control module 50 reads the numerical control program of the program number designated by a predetermined program execution command from among several numerical control programs for the machine tool stored in the machine tool program storage section 521, and generates a machine tool control signal by analyzing the command classification based on this numerical control program. The machine tool 2 operates according to the machine tool control signal sent from the machine tool control module 50 to machine a workpiece (not shown).

The robot control module 51 generates various commands for controlling operation of the robot 3 and tool 32 based on the numerical control programs for the robot stored in the robot program storage section 522, and sends these to the robot control device 6. More specifically, the robot control module 51 includes a program pre-processing unit 54, program execution command unit 57, program execution manager 58 and first communication unit 59.

The program pre-processing unit 54, by reading the numerical control programs for the robot configured by a plurality of command blocks from the robot program storage section 522, and conducting the pre-processing indicated by the following sequence on the read numerical control program for the robot, generates a block robot command, which is a robot command written in a format recognizable in the robot control device 6, for every command block configuring the numerical control program for the robot, and stores the generated plurality of block robot commands in the robot command storage section 523.

More specifically, the program pre-processing unit 54 includes a program inputter 541, input analyzer 542, and robot command generator 543, and conducts pre-processing on the numerical control program for the robot by using these.

Hereinafter, a case of the program pre-processing unit 54 starting the pre-processing explained below in response to generation, selection or editing of the numerical control program for the robot by the program editing unit 53 having completed will be explained; however, the timing of starting pre-processing is not limited thereto. The program pre-processing unit 54 is sufficient so long as starting the pre-processing explained below, at latest, before the program execution command unit 57 inputs the program execution command described later to the program execution manager 58 described later.

First, the program inputter 541 reads a program on which pre-processing has not been conducted from among a plurality of numerical control programs for the robot stored in the robot program storage section 522, i.e. a numerical control program for the robot for which generation, selection or editing by the program editing unit 53 has completed, and successively inputs this to the input analyzer 542 for every command block.

The input analyzer 542 analyzes the command classification based on the numerical control program for the robot input from the program inputter 541 for every command block, and sends the analysis result thereto to the robot command generator 543 for every command block.

The robot command generator 543 generates a block robot command, which is a robot command recognizable in the robot control device 6, and block information associated with this block robot command for every command block, based on the analysis result sent from the input analyzer 542 for every command block, and stores the generated block robot command and block information in the robot command storage section 523. More specifically, the robot command generation unit 543 generates a block robot command recognizable by the robot control device 6, by changing the language of the read numerical control program for the robot into a language recognizable by the robot control device 6. Herein, in the processing of changing the language of the numerical control program for the robot to a language recognizable in the robot control device 6, processing of changing the character code of the numerical control program for the robot to a character code recognizable in the robot control device 6, processing of changing the numerical control program for the robot to a language recognizable in the robot control device 6, etc. are included. In addition, the block information includes the program number of the numerical control program for the robot read upon generating the block robot command, block number of the numerical control program for the robot, etc.

Figure 3:
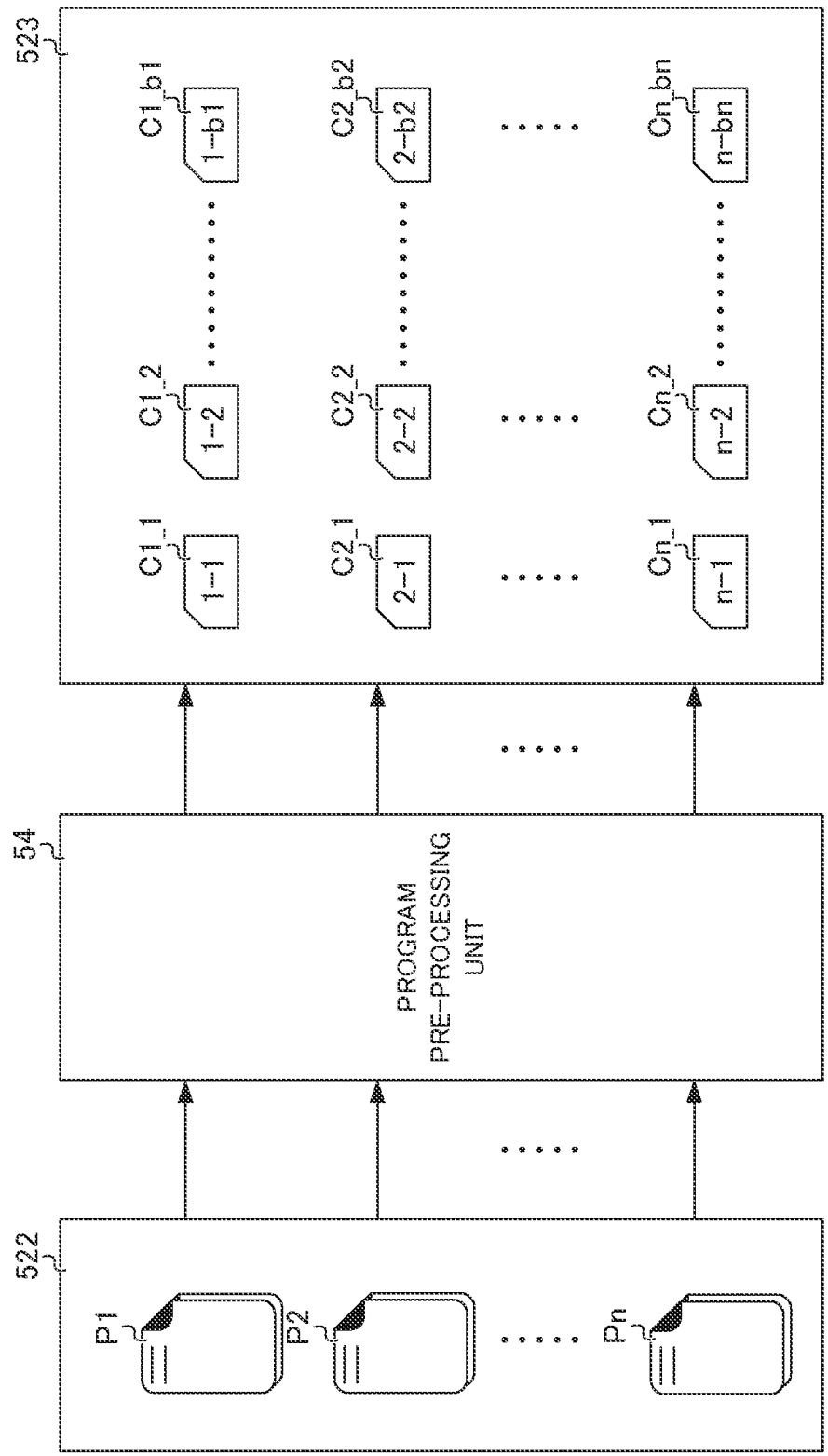
FIG. 3 is a view schematically showing several block robot commands generated by pre-processing of a program pre-processing unit.

FIG. 3 is a view schematically showing a block robot command generated by the above such program pre-processing unit 54.

As shown in FIG. 3, the program pre-processing unit 54 generates a plurality of block robot commands $Ci\_j$, and a plurality of block information sets (i-j) associated with each block robot command $Ci\_j$, by conducting the aforementioned such pre-processing on each of the numerical control program P1 of program number 1, numerical control program P2 of program number 2, . . . , numerical control program Pn of program number n, of n group ("n" is any integer) stored in the robot program storage section 522. The robot command storage section 523 stores the plurality of block robot commands $Ci\_j$ generated by the program pre-processing unit 54 in a form associated with the block information set (i-j) as shown in FIG. 3. Herein, "i" is any integer from 1 to n corresponding to the program number. In addition, "j" is any integer from 1 to the command block number of the plurality of numerical control programs, corresponding to the block number. It should be noted that, hereinafter, a case of conducting pre-processing by the program pre-processing unit 54 on all of the numerical control programs P1, . . . , Pn of n group stored in the robot program storage section 522 is explained; however, the present disclosure is not limited thereto. The program pre-processing unit 54 may conduct pre-processing only on one selected by selection processing (not shown) among the numerical control programs of several groups stored in the robot program storage section 522.

More specifically, by conducting pre-processing on the numerical control program P1 configured by b1 number of command blocks, the program pre-processing unit 54 generates a total of b1 number of block robot commands $C1\_1$, $C1\_2$, . . . , $C1\_b1$, and by conducting pre-processing on the numerical control program P2 configured by b2 number of command blocks, it generates a total of b2 number of block robot commands $C2\_1$, $C2\_2$, . . . , $C2\_b2$, and by conducting pre-processing on numerical control program Pn configured by bn number of command blocks, it generates a total of bn number of block robot commands $Cn\_1$, $Cn\_2$, . . . , $Cn\_bn$.

Referring back to FIG. 2, the program execution command unit 57 generates a program execution command for the numerical control program of the program number designated based on an operation by the operator, for example, among the several numerical control programs for the robot stored in the robot program storage section 522, and inputs this to the program execution manager 58.

The program execution manager 58, on the event of a program execution command being inputted from the program execution command unit 57, reads several block robot commands designated by this program execution command from the robot command storage section 523, and writes the read several block robot commands into the first communication unit 59. More specifically, the program execution manager 58 reads the plurality of block robot commands $Ci\_1$, $Ci\_2$, . . . , $Ci\_bi$ belonging to the program number i designated by the program execution command in the designated order by the program execution command (for example, order from one having smallest block number), and writes the read plurality of block robot commands $Ci\_1$, $Ci\_2$, . . . , $Ci\_bi$ into the first communication unit 59 in the designated order by the program execution command.

The first communication unit 59 sends the plurality of block robot commands $Ci\_1$, $Ci\_2$, . . . , $Ci\_bi$ read into the program execution manager 58 to the second communication unit 69 described later of the robot control device 6 one by one in the write order by the program execution manager 58 (i.e. same order as write order by the program execution manager 58, same order as designated order based on the program execution command). More specifically, the first communication unit 59 sends the plurality of block robot commands Ci_1, Ci_2, . . . , Ci_bi read into the program execution manager 58 to the second communication unit 69 one by one every time receiving the operation completion notification described later sent from the second communication unit 69, in the write order by the program execution manager 58.

Next, the configuration of the robot control device 6 will be explained in detail. As shown in FIG. 2, various functions such as of the input analysis unit 60, robot program generation unit 61, operation control unit 65 second communication unit 69 are realized by the above hardware configuration in the robot control device 6.

The second communication unit 69 transmits various commands and notifications mutually with the first communication unit 59 of the numerical control device 5. More specifically, the second communication unit 69, when receiving the block robot command sent from the first communication unit 59, inputs this block robot command successively to the input analysis unit 60. In addition, the second communication unit 69, when the operation completion notification is written by the program manager 613 in accordance with the sequence explained later, sends this operation completion notification to the first communication unit 59.

The input analysis unit 60 analyzes the block robot command sent from the numerical control device 5 via the second communication unit 69, and sends the analysis result to the robot program generation unit 61 and operation control unit 65.

The robot program generation unit 61 includes a robot instruction generator 612, program manager 613 and storage section 614, and generates a robot program according to a block robot command sent from the input analysis unit 60 using these.

The robot instruction generator 612, when a block robot command is inputted from the input analysis unit 60, notifies the robot instruction corresponding to the inputted block robot command to the program manager 613.

The program manager 613, when a robot instruction is inputted from the robot instruction generator 612, adds the robot instruction inputted to the robot program stored in the storage section 614. A robot program according to the block robot commands sent from the numerical control device 5 is thereby generated in the storage section 614.

The numerical control unit 65 includes a program launcher 651, trajectory controller 652, kinematic controller 653 and servo controller 654, and controls operation of the robot 3 using these.

The program launcher 651 sends the program start notification to the program manager 613, in response to the generation of the robot program completing based on the block robot command in the aforementioned robot program generation unit 61 after the block robot command is input from the input analysis unit 60, in order to launch this robot program. The program manager 613 launches the robot program stored in the storage section 614, in response to receiving this program launch notification. The program manager 613 creates an operation plan of the robot 3 and operation plan of the tool 32 according to the block robot command, by successively executing the robot instruction written in the booted robot program. In addition, the program manager 613 sends the generated operation plan of the robot 3 to the trajectory controller 652, and sends the generated operation plan of the tool 32 to the servo controller 654.

The trajectory controller 652, when receiving the operation plan of the robot 3 from the program manager 613, calculates the operation trajectory of the control point of the robot 3 by executing interpolation processing based on this operation plan, and inputs to the kinematics controller 653. The kinematics controller 653 calculates the angle of each joint of the robot 3 as a target angle by performing kinematics computation based on the operation trajectory calculated by the trajectory controller 652, and sends these target angles to the servo controller 654.

The servo controller 654 generates a robot control signal to the robot 3 by feedback controlling each servo motor of the robot 3 so that the target angle of each joint sent from the kinematics controller 653 is realized, and inputs to the servo motors of the robot 3. In addition, the servo controller 654, when receiving the operation plan of the tool 32 sent from the program manager 613, generates an I/O signal for driving the tool 32 in accordance with this operation plan, and inputs to the tool 32.

In addition, the program manager 613, when control of operation of the robot 3 and tool 32 has completed based on one block robot command according to the above sequence, writes the operation completion notification into the second communication unit 69. The second communication unit 69, when the operation completion notification is written by the program manager 613, sends this operation completion notification to the first communication unit 59 of the numerical control device 5. In addition, the first communication unit 59, in response to receiving the operation completion notification sent from the second communication unit 69, sends the next block robot command to the second communication unit 69 in the writing order by the program execution manager 58 in the above way.

In the above way, in the robot control device 6, when receiving block robot commands sent from the numerical control device 5, the robot program generation unit 61 generates a robot program based on these block robot commands, and further controls operation of the robot 3 and tool 32 by executing this robot program.

Next, the flow of various signals and information of the numerical control system 1 configured in the above way will be explained while referencing FIGS. 4 and 5.

Figure 4:
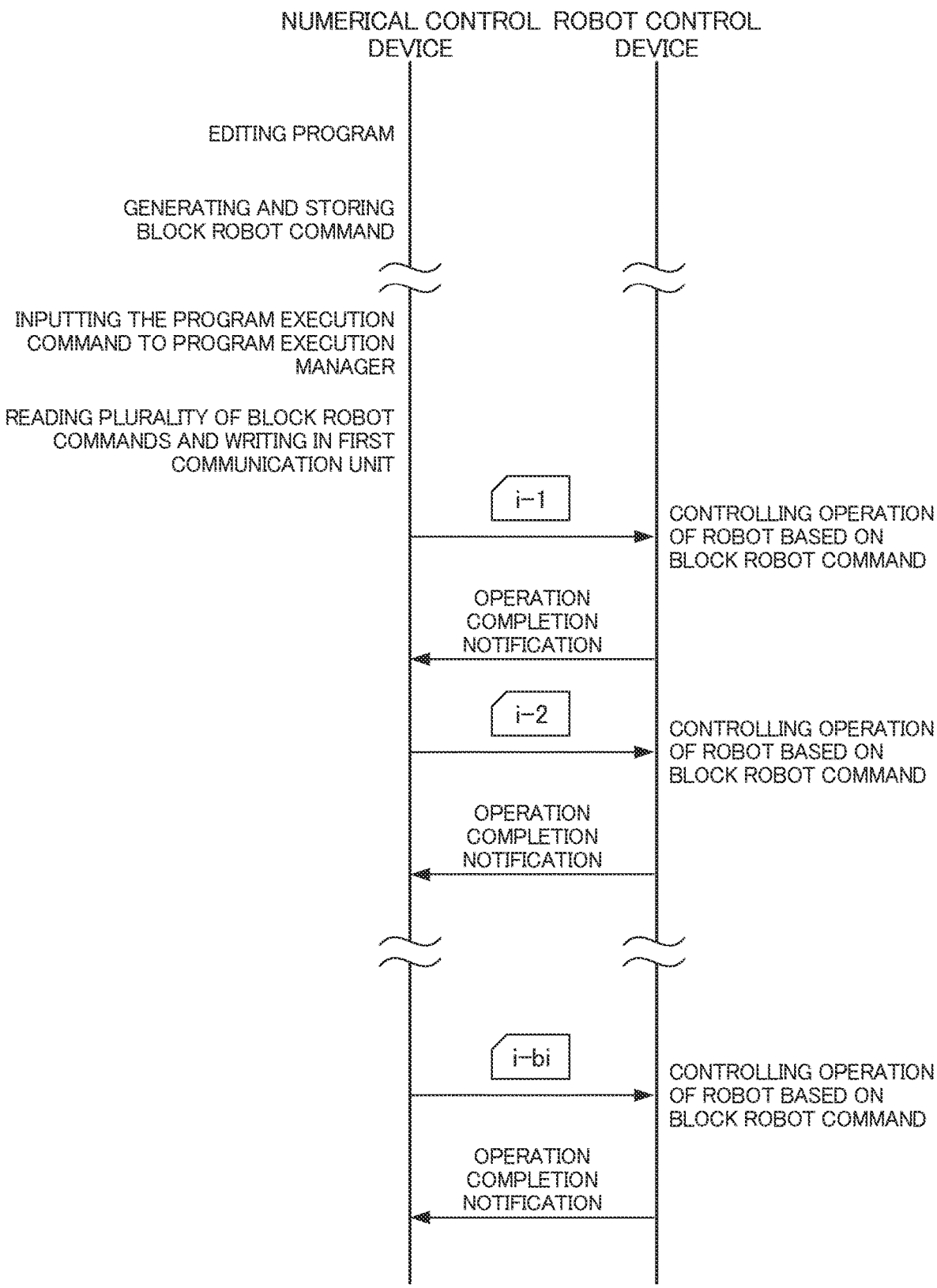
FIG. 4 is a sequence diagram showing the flow of signals and information between the numerical control device and robot control device, processing executed in the numerical control device, and processing executed in the robot control device.

FIG. 4 is a sequence diagram showing the flow of signals and information between the numerical control device 5 and robot control device 6, the processing executed in the numerical control device 5, and processing executed in the robot control device 6.

First, the program pre-processing unit 54 of the numerical control device 5, in response to editing of the numerical control program for the robot being completed by the program editing unit 53, generates several block robot commands by conducting pre-processing on this numerical control program, and stores these in the robot command storage section 523.

Figure 5:
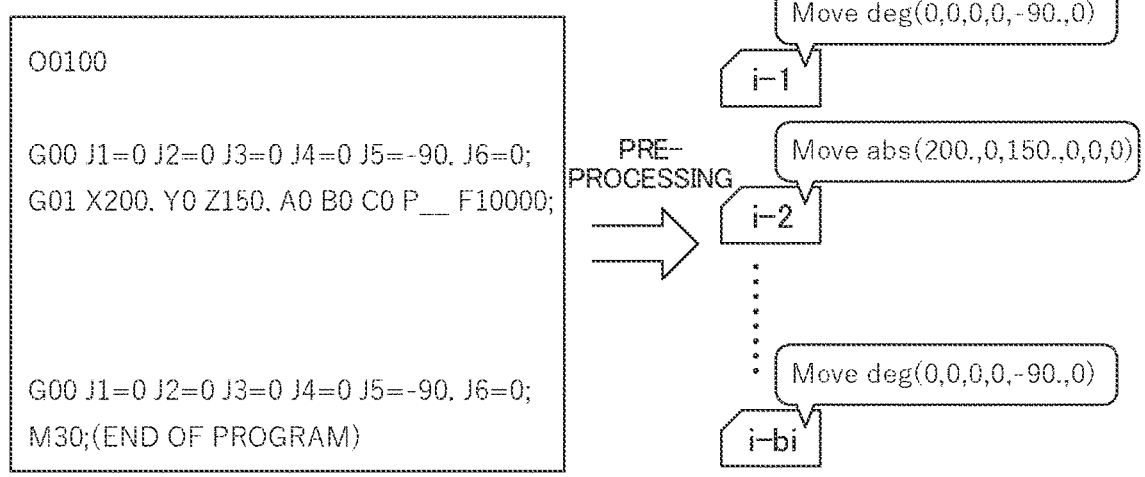
FIG. 5 is a view showing an example of a numerical control program for a robot, and several block robot commands generated by conducting pre-processing on this numerical control program.

FIG. 5 is a view showing a numerical control program for the robot, and an example of several block robot commands generated by conducting pre-processing on this numerical control program.

The left side of FIG. 5 shows an example of a numerical control program defining the program number as "i", and defining the command block number as "bi". The command block of block number "1" in the numerical control program of FIG. 5 is configured by a command for transitioning the control point of the robot 3 to the coordinate value (0, 0, 0, 0, −90, 0) designated under the joint coordinate format by rapid traverse, the command block of block number "2" is configured by a command for transitioning the control point of the robot 3 to the coordinate value (200., 0, 150., 0, 0, 0, _) designated under the orthogonal coordinate format by linear interpolation, and the command block of block number "bi" is configured by a command for transitioning the control point of the robot 3 to the coordinate value (0, 0, 0, 0, −90, 0) designated under the orthogonal coordinate format by rapid traverse.

The program pre-processing unit 54 generates a total "bi" number of block robot commands and block information set associated with each block robot command as shown on the right side in FIG. 5, by conducting pre-processing on such a numerical control program, and stores this in the robot command storage section 523. FIG. 5 shows a case of conducting pre-processing on the numerical control program of the language thereof to a language recognizable in the robot control device 6. The block robot command associated with the block information (i-1) is "Move deg (0, 0, 0, 0, −90., 0)", the block robot command associated with block information (i-2) is "Move abs (200., 0, 150, 0, 0, 0)", and the block robot command associated with block information (i-bi) is "Move deg (0, 0, 0, 0, −90., 0)".

Referring back to FIG. 4, subsequently, the program execution command unit 57 of the numerical control device 5 generates a program execution command for the numerical control program of program number "i" on which pre-processing was completed in the above-mentioned way based on an operation by the operator, and inputs this to the program execution manager 58.

Subsequently, the program execution manager 58 of the numerical control device 5, in response to a program execution command being inputted, reads the block robot command associated with the block information (i-j) ("j" is a block number, and integer between 1 and bi) from the robot command storage section 523 in order from the one having smaller block number, and writes the read several block robot commands in order into the first communication unit 59.

Subsequently, the first communication unit 59 of the numerical control device 5 first sends the block robot command associated with the block information (i-1) to the robot control device 6.

Subsequently, the robot control device 6, in response to receiving a block robot command associated with the block information (i-1), generates a robot program based on this block robot command, and transitions the control point of the robot 3 by execution thereof to the coordinate value designated by the joint coordinate format (0, 0, 0, 0, −90, 0) by rapid traverse. In addition, the robot control device 6, when the control of operation of the robot 3 completes, sends the operation completion notification to the numerical control device 5.

Subsequently, the first communication unit 59 of the numerical control device 5, in response to receiving the operation completion notification, sends the block robot command associated with the next block information (i-2) to the robot control device.

Subsequently, the robot control device 6, in response to receiving the block robot command associated with block information (i-2), moves the control point of the robot 3 by linear interpolation to the coordinate values (200., 0, 150., 0, 0,) designated under the orthogonal coordinate format, by generating and executing a robot program based on this block robot command. In addition, the robot control device

6, when control of operation of the robot 3 has completed, sends an operation completion notification to the numerical control device 5.

Hereafter, the transmission of block robot commands and operation completion notification is repeated between the numerical control device 5 and robot control device 6, until control of operation of the robot 3 based on the block robot command associated with the block information (i-bi) completes.

According to the present embodiment, the following effects are exerted. In the present embodiment, the program pre-processing unit 54 of the numerical control device 5 generates block robot commands recognizable in the robot control device 6 and block information associated with this block robot command, based on analysis results for every block of the numerical control program, and the robot command storage section 523 of the numerical control device 5 stores the generated block robot command and block information. In addition, the program execution manager 58 of the numerical control device 5 reads the block robot command associated with block information designated by the block execution command from the robot command storage section 523, and the first communication unit 59 of the numerical control device 5 sends the block robot command read by the program execution manager 58 to the robot control device 6. According to the present embodiment, by generating the block robot command and block information for all blocks included in the numerical control program by the program pre-processing unit 54 in advance prior to inputting the program execution command to the program execution manager 58, and storing these in the robot command storage section 523 in the above way, it is unnecessary to execute processing of generating a block robot command from the numerical control program upon sending the block robot command from the numerical control device 5 to the robot control device 6. For this reason, according to the present embodiment, it is possible to shorten the cycle time of robot control by the amount required in the generation processing of block robot commands, compared to a conventional numerical control system, while achieving synchronization of executions blocks of programs between the numerical control device 5 and robot control device 6.

In the present embodiment, the program pre-processing unit 54 starts analysis of the robot numerical control program, and generation of the block robot command and block information, before the program execution command is inputted from the program execution command unit 57 to the program execution manager 58. It is thereby possible to shorten the cycle time of robot control by the amount required in generation processing of the block robot command, compared to a conventional numerical control system.

In the present embodiment, the program pre-processing unit 54, in response to the creation, selection or editing of the robot numerical control program by the program editing unit 53 having completed, starts the analysis of this robot numerical control program and generation of the block robot command and block information. It is thereby possible to start the control of operation of the robot as quickly as possible based on the robot numerical control program for which creation, selection or editing has completed.

In the present embodiment, the program pre-processing unit 54 generates a block robot command by changing the language of the numerical control program to a language recognizable in the robot control device 6. In addition, the program pre-processing unit 54 generates the block robot command, by changing the character code of the numerical control program to a character code recognizable in the robot control device 6. It is thereby possible to generate a block robot command recognizable by an existing robot control device 6.

In the present embodiment, the program execution manager 58 reads a plurality of block robot commands associated with each of a plurality of sets of block information designated by the program execution command, in the designated order by the program execution command, and the first communication unit 59 sends the plurality of block robot commands to the second communication unit 69 one by one, every time receiving an operation competition notification sent from the second communication unit 69, in the reading order according to the program execution manager 58. It is thereby possible to achieve synchronization of the execution blocks of the programs between the numerical control device 5 and robot control device 6 more reliably.

Second Embodiment

Hereinafter, a numerical control system related to a second embodiment of the present disclosure will be explained by referencing the drawings. The numerical control system according to the present embodiment mainly differs in the sending sequence of block robot commands from the numerical control system 1 according to the first embodiment.

FIG. 6 is a sequence diagram according to the present embodiment showing the flow of signals and information between the numerical control device and robot control device, processing executed in the numerical control device, and processing executed in the robot control device. In the numerical control system according to the present embodiment, the sequence of the program editing unit creating, selecting or editing a numerical control program, the sequence of the program pre-processing unit generating a plurality of block robot commands and block information and storing in the robot command storage section, the sequence of the program execution command unit generating program execution commands for the numerical control program and inputting to the program execution manager, the sequence of the program execution manager reading a plurality of block robot commands from the robot command storage section, the sequence of the robot control device controlling operation of the robot based on the block robot commands, etc. are the same as the numerical control system according to the first embodiment; therefore, detailed explanation thereof will be omitted below. It should be noted that, hereinafter, a case of executing the same numerical control program as FIG. 5 will be explained as an example.

As shown in FIG. 6, the program execution manager of the numerical control device, in response to the program execution command being input, reads the block robot command from the robot command storage section, and starts writing to the buffer provided to the first communication unit of the read block commands, similarly to the first embodiment. It should be noted that the buffer provided to the first communication unit is a so-called FIFO buffer which outputs block robot commands in the write order. It should be noted that, hereinafter, although a case of providing the buffer to the first communication unit is explained, the present disclosure is not limited thereto. A similar buffer may be provided to the second communication unit. It is possible to realize the same operation with slight corrections, also in the case of providing the buffer to the second communication unit.

As shown in FIG. 6, the program execution manager first writes the block robot command associated with block information (i−1) in the buffer of the first communication unit, and generates an execution command for the block robot command associated with this block information (i−1). The first communication unit thereby sends the block robot command associated with the block information (i−1) together with the execution command for this block robot command to the robot control device 6.

Subsequently, the robot program generator of the robot control device reads the received block robot command, and generates a robot program. In addition, the operation controller of the robot control device, in response to receiving the execution command from the numerical control device, starts control of operation of the robot based on the block robot command associated with the block information (i−1), by launching the generated robot program.

While controlling operation of the robot by operating in the above way, the second communication unit of the robot control device sends the read completion notification to the first communication unit, in response to reading by the robot program generation unit of the previously received block robot command having completed.

Subsequently, the first communication unit of the numerical control device, in response to receiving the read completion notification sent from the second communication unit, sends a block robot command written in the next buffer in the write order by the program execution manager, i.e. block robot command associated with block information (i−2), to the second communication unit.

Subsequently, the robot block generation unit of the robot control device reads the received block robot command, and generates the robot program based on the block robot command associated with block information (i−2).

Subsequently, the second communication unit of the robot control device, in response to control of operation of the robot completing based on the block robot command associated with block information (i−1), sends the operation completion notification to the first communication unit.

Subsequently, the program execution manager of the numerical control device, in response to receiving the operation completion notification sent from the second communication unit, sends the next block robot command in the write order by the program execution manager, i.e. execution command for the block robot command associated with the block information (i−2), to the robot control device via the first communication unit, to transfer to execution of the next command block.

Subsequently, the operation controller of the robot control device, in response to receiving an execution command from the numerical control device, starts control of operation of the robot based on the block robot command associated with the block information (i−2), by launching the robot program previously generated.

Hereafter, the program execution manager of the numerical control device reads several block robot commands associated with each of several block information sets designated by the program execution command in the designated order by the program execution command (for example order from smallest block number), and writes the read several block robot commands in this designated order into the buffer of the first communication unit. In addition, the second communication unit of the robot control device sends the read completion notification to the first communication unit every time reading of one block robot command is completed. In addition, the first communication unit sends the block robot commands written in the buffer to the second communication unit one by one every time receiving a read completion notification from the second communication unit, in the writing order according to the program execution manager. It is thereby possible to send several block robot commands to the robot control device from the numerical control device in the appropriate order, and generate a robot program according to each block robot command in the robot control device.

In addition, while sending several block robot commands from the numerical control device to the robot control device according to the above sequence, the second communication unit sends the operation completion notification associated with the block robot command for which execution has completed to the first communication unit, every time control of operation of the robot completes based on one block robot command. In addition, the program execution manager, in response to the above-mentioned operation completion notification being received in the first communication unit, generates an execution command for the next block robot command of the block robot command associated with the operation completion notification in the above-mentioned designated order, and the first communication unit, in response to the execution command being generated by the program execution manager, sends this execution command to the second communication unit. In addition, the operation control unit, in response to the execution command being received in the second communication unit, executes the robot program associated with this execution command, and controls the operation of the robot. With the numerical control system according to the present embodiment, by sending the execution command for each block robot command to the robot control device from the numerical control device according to such a sequence, since it is possible to launch the generated robot program concurrently with generation of the robot program, based on several block robot commands, compared to the numerical control system 1 according to the first embodiment, it is possible to further shorten the cycle time.

According to the present embodiment, the same effects as the first embodiment are exerted. In addition, the present disclosure is not limited to the above-mentioned embodiments, and various changes and modifications thereto are possible.

EXPLANATION OF REFERENCE NUMERALS 1 numerical control system
2 machine tool
3 robot
numerical control device
machine tool control module
51 robot control module
52 storage unit
521 machine tool program storage section
522 robot program storage section (program storage unit)
523 robot command storage section
53 program editing unit
54 program pre-processing unit
57 program execution command unit
58 program execution manager
59 first communication unit
6 robot control device
input analysis unit
61 robot program generation unit
operation control unit
69 second communication unit

The invention claimed is:

1. A numerical control device which, based on a numerical control program, controls operation of a machine tool, and generates a robot command for a robot control device that controls operation of a robot, the numerical control device comprising:
a processor configured to execute instructions to implement:
a program pre-processing unit configured to generate a plurality of block robot commands recognizable in the robot control device, and a plurality of block information associated with each block robot command, based on an analysis result of every block of the numerical control program;
a robot command storage section configured to store a plurality of block robot commands and block information generated by the program pre-processing unit;
a program execution manager configured to read a plurality of block robot commands associated with each of a plurality sets of block information designated by a predetermined program execution command, from the robot command storage section; and
a communication unit configured to send a plurality of block robot commands read by the program execution manager to the robot control device one by one every time receiving a completion notification sent from the robot control device.

2. The numerical control device according to claim 1, further comprising:
a program storage section implemented by a memory device configured to store a robot numerical control program, which is a numerical control program for generating a robot command; and
a program execution command unit implemented by the processor configured to generate a program execution command for the robot numerical control program, and input this to the program execution manager,
wherein the program pre-processing unit, prior to the program execution command being inputted to the program execution manager, starts analysis of the robot numerical control program and generation of the block robot command and the block information.

3. The numerical control device according to claim 2, further comprising a program editing unit implemented by the processor configured to create, select or edit the robot numerical control program,
wherein the program pre-processing unit, in response to creation, selection or editing of the robot numerical control program by the program editing unit completing, starts analysis of the robot numerical control program, and generation of the block robot command and the block information.

4. The numerical control device according to claim 1, wherein the program pre-processing unit generates the block robot command by changing a language of the numerical control program to a language recognizable in the robot control device.

5. A numerical control system comprising: a numerical control device configured to control operation of a machine tool, and generate a robot command for a robot control device that controls operation of a robot, based on a numerical control program; and a robot control device configured to be communicable with the numerical control device and control operation of the robot based on a robot command sent from the numerical control device, wherein the numerical control device includes:
a program pre-processing unit configured to generate a plurality of block robot command recognizable in the robot control device, and a plurality of block information associated with each block robot command, based on an analysis result of every block of the numerical control program;
a robot command storage section configured to store a plurality of block robot commands and block information generated by the program pre-processing unit;
a program execution manager configured to read a plurality of block robot commands associated with each of a plurality sets of block information designated by a predetermined program execution command, from the robot command storage section; and
a first communication unit configured to send a plurality of block robot commands read by the program execution manager to the robot control device one by one every time receiving a completion notification sent from the robot control device;
wherein the robot control device includes:
a second communication unit configured to receive a block robot command sent from the first communication unit,
a robot program generation unit configured to generate a robot program based on a block robot command received by the second communication unit, and
an operation control unit configured to control operation of the robot based on a robot program generated by the robot program generation unit, and
wherein the second communication unit sends the completion notification to the first communication unit every time processing based on one block robot command is completed.

6. The numerical control system according to claim 5, further comprising: a program storage unit configured to store a robot numerical control program which is a numerical control program for generating robot commands; and a program execution command unit which generates a program execution command for the robot numerical control program, and inputs this to the program execution manager,
wherein the program pre-processing unit, prior to the program execution command being input to the program execution manager, starts analysis of the robot numerical control program and generation of the block robot command and the block information.

7. The numerical control system according to claim 6, wherein the numerical control device further includes a program editing unit configured to create, select or edit the robot numerical control program, and
wherein the program pre-processing unit, in response to creation, selection or editing of the robot numerical control program by the program editing unit completing, starts analysis of the robot numerical control program and generation of the block robot command and the block information.

8. The numerical control system according to claim 5, wherein the program pre-processing unit generates the block robot command by changing a language of the numerical control program to a language recognizable in the robot control device.

9. The numerical control system according to claim 5, wherein the program execution manager reads, in a designated order by the program execution command, a plurality of block robot commands associated with each of a plurality of sets of block information designated by the program execution command,
wherein the second communication unit sends an operation completion notification to the first communication unit, every time when control of the operation of the robot based on one block robot command is competed, and
wherein the first communication unit sends a plurality of block robot commands to the second communication unit one by one every time receiving the operation completion notification, in a reading order according to the program execution manager.

10. The numerical control system according to claim 5, wherein the program execution manager reads, in a designated order by the program execution command, a plurality of block robot commands associated with each of a plurality of sets of block information designated by the program execution command, and writes into a storage region of the first communication unit,
wherein the second communication unit sends a read completion notification to the first communication unit every time reading of one block robot command completes, and
wherein the first communication unit sends a block robot command written in the storage region to the second communication unit one by one every time receiving the reading completion notification, in a writing order according to the program execution manager.

11. The numerical control system according to claim 10, wherein the second communication unit sends an operation completion notification associated with a block robot command for which execution has completed to the first communication unit, every time when control of the operation of the robot based on one block robot command is completed,
wherein the program execution manager, in response to the operation completion notification being received in the first communication unit, generates an execution command for a next block robot command of the block robot command associated with the operation completion notification in the designated order,
wherein the first communication unit, in response to an execution command being generated by the program execution manager, sends the execution command to the second communication unit, and
wherein the operation control unit, in response to the execution command being received in the second communication unit, executes a robot program associated with the execution command, and controls operation of the robot.

* * * * *